United States Patent
Sato

(10) Patent No.: US 8,977,946 B2
(45) Date of Patent: Mar. 10, 2015

(54) PRESENTATION APPARATUS AND PRESENTATION CONTROL METHOD

(75) Inventor: Noriaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1829 days.

(21) Appl. No.: 11/773,999

(22) Filed: Jul. 6, 2007

(65) Prior Publication Data

US 2008/0031488 A1 Feb. 7, 2008

(30) Foreign Application Priority Data

Aug. 3, 2006 (JP) ................. 2006-212242

(51) Int. Cl.
*G06F 17/21* (2006.01)
*G06T 11/60* (2006.01)
*G06F 9/44* (2006.01)

(52) U.S. Cl.
CPC .............. *G06T 11/60* (2013.01); *G06F 9/4443* (2013.01)
USPC ...................................................... 715/204

(58) Field of Classification Search
CPC .................................................. G06F 17/211
USPC ........................................................ 715/204
See application file for complete search history.

(56) References Cited

U.S. PATENT DOCUMENTS

| | | | | |
|---|---|---|---|---|
| 5,283,560 A | * | 2/1994 | Bartlett | 715/729 |
| 5,666,554 A | * | 9/1997 | Tanaka | 715/203 |
| 5,790,114 A | * | 8/1998 | Geaghan et al. | 715/763 |
| 5,805,162 A | * | 9/1998 | Imai et al. | 715/788 |
| 6,118,427 A | * | 9/2000 | Buxton et al. | 345/629 |
| 6,121,960 A | * | 9/2000 | Carroll et al. | 345/173 |
| 6,133,962 A | * | 10/2000 | Proehl et al. | 725/44 |
| 6,806,892 B1 | * | 10/2004 | Plow et al. | 715/781 |
| 6,981,227 B1 | * | 12/2005 | Taylor | 715/768 |
| 7,096,432 B2 | * | 8/2006 | Huapaya et al. | 715/863 |
| 7,240,360 B1 | * | 7/2007 | Phan | 726/2 |
| 7,549,129 B2 | * | 6/2009 | Sheldon et al. | 715/835 |
| 7,624,356 B1 | * | 11/2009 | Rockey et al. | 715/811 |
| 2001/0024200 A1 | * | 9/2001 | Gupta et al. | 345/418 |
| 2002/0024539 A1 | * | 2/2002 | Eleftheriadis et al. | 345/765 |

(Continued)

FOREIGN PATENT DOCUMENTS

| | | | | |
|---|---|---|---|---|
| JP | 06-124183 | 5/1994 | | G06F 3/14 |
| JP | 10-171590 | 6/1998 | | G06F 3/14 |

(Continued)

OTHER PUBLICATIONS

Gieskens, Daniel F., and James D. Foley. "Controlling user interface objects through pre- and postconditions." in Proceedings of the SIGCHI conference on Human factors in computing systems, pp. 189-194. ACM, 1992.*

*Primary Examiner* — Frank D Mills
(74) *Attorney, Agent, or Firm* — Fitzpatrick, Cella, Harper & Scinto

(57) ABSTRACT

A presentation apparatus stores parts data that includes parts data that includes type, location, and size of component parts that are displayed within a selected screen area, together with a selection rule that depicts the type of the component part that is to change a drawing state when the presentation apparatus is running in a presentation mode. When executing a presentation process, the apparatus selects a component part from the parts data, according to the selection rule, processes the selected screen area by changing an image of the selected component part, and generates the image to be used in the presentation.

13 Claims, 8 Drawing Sheets

(56) References Cited

U.S. PATENT DOCUMENTS

| | | | |
|---|---|---|---|
| 2002/0140736 A1* | 10/2002 | Chen | 345/777 |
| 2003/0046401 A1* | 3/2003 | Abbott et al. | 709/228 |
| 2003/0058227 A1* | 3/2003 | Hara et al. | 345/178 |
| 2003/0090504 A1* | 5/2003 | Brook et al. | 345/716 |
| 2003/0105678 A1* | 6/2003 | Bratton | 705/26 |
| 2004/0130554 A1* | 7/2004 | Bangham | 345/589 |
| 2004/0268267 A1* | 12/2004 | Moravcsik | 715/821 |
| 2005/0025359 A1* | 2/2005 | Priddy | 382/173 |
| 2005/0094205 A1* | 5/2005 | Lo et al. | 358/1.18 |
| 2005/0172221 A1* | 8/2005 | Kobashi et al. | 715/513 |
| 2005/0177772 A1* | 8/2005 | Derks et al. | 714/25 |
| 2006/0075228 A1* | 4/2006 | Black et al. | 713/167 |
| 2006/0136841 A1* | 6/2006 | Fritz | 715/818 |
| 2006/0184878 A1* | 8/2006 | Argo et al. | 715/700 |
| 2006/0236264 A1* | 10/2006 | Cain et al. | 715/788 |
| 2006/0274944 A1* | 12/2006 | Tanaka et al. | 382/186 |
| 2007/0003220 A1* | 1/2007 | Hamasaka et al. | 386/95 |
| 2007/0118817 A1* | 5/2007 | Gunderson | 715/835 |
| 2007/0180395 A1* | 8/2007 | Yamashita et al. | 715/778 |
| 2007/0240069 A1* | 10/2007 | Eldridge et al. | 715/763 |
| 2007/0245264 A1* | 10/2007 | Hoerentrup et al. | 715/835 |
| 2007/0257930 A1* | 11/2007 | Wade et al. | 345/589 |
| 2007/0288856 A1* | 12/2007 | Butlin et al. | 715/762 |
| 2008/0004506 A1* | 1/2008 | Ikeda et al. | 600/300 |

FOREIGN PATENT DOCUMENTS

| | | | | |
|---|---|---|---|---|
| JP | 2000-89890 | | 3/2000 | G06F 3/00 |
| JP | 2006145882 A | * | 6/2006 | |
| WO | WO 00/36484 A2 | * | 6/2000 | |

* cited by examiner

| ID | Type | Location | Size | Color | Owner |
|---|---|---|---|---|---|
| 1 | Form | (0,0) | (100,100) | Gray | - |
| 2 | Menu | (0,10) | (100,10) | Gray | 1 |
| 3 | ToolBar | (0,20) | (100,10) | Gray | 1 |
| 4 | Button | (0,20) | (10,10) | Gray | 3 |
| 5 | Button | (10,20) | (10,10) | Gray | 3 |
| 6 | Button | (20,20) | (10,10) | Gray | 3 |
| 7 | TextBox | (0,30) | (100,70) | White | 1 |
| 8 | ScrollBar | (90,30) | (10,70) | Gray | 7 |
| 9 | PictureBox | (45,45) | (40,40) | White | 7 |
| 10 | Button | (10,80) | (20,10) | Gray | 7 |

PRESENTATION APPARATUS AND PRESENTATION CONTROL METHOD

BACKGROUND OF THE INVENTION

1. Field of the Invention

The present invention relates to a presentation apparatus and a presentation control method that allows a presentation, wherein an application is employed that does not possess a presentation function.

2. Description of the Related Art

Proliferation of personal computers in recent years has led to digitization of a variety of office administrative tasks, a trend that is extending from paper-based operations to the conference room. A prominent example thereof is a presentation apparatus, essentially a digital whiteboard.

The presentation apparatus performs a presentation by operating in a window that an application provides (application window), and performs an annotation in the application window or elsewhere. Not all applications possess the annotation function, however. Consequently, a technology is called for that offers the annotation function to an application that does not feature the annotation function, thus adding a presentation function to a wide range of applications.

Japanese Patent Laid Open No. 06-124183 (hereinafter "Cited Reference 1") proposes a presentation apparatus that overlays a transparent window over a window that is displayed by an application, and performs an annotation therein. Japanese Patent Laid Open No. 10-171590 (hereinafter "Cited Reference 2") proposes a presentation apparatus that performs a screen capture of a desired image that is displayed by an application as a bitmap, and performs the annotation as a background of the image thus acquired. Japanese Patent Laid Open No. 2000-89890 (hereinafter "Cited Reference 3") proposes a technology that changes a button display in response to whether or not an operation is valid.

The presentation apparatuses in question possess two operating modes. One is an application mode that performs an operation of the application, and the other is a presentation mode that performs an annotation in such as an application window. Given, however, that the presentation apparatuses according to the foregoing technologies do not differentiate in a screen display between the application mode and the presentation mode, it is difficult to distinguish the operation mode based on the screen display alone.

For example, if a button is attached to the application window, the appearance of the button will not change, even if the transparent window is overlaid on the application window, per the Cited Reference 1, or if a screen capture of the application window is performed, per the Cited Reference 2, leading to mistakenly identifying the presentation mode as the application mode, and thus, causing a user to depress the button in the application mode, even though the presentation mode is the currently active mode.

If a user personally builds the application to be used for presentation, it is possible to apply the technique disclosed in the Cited Reference 3 to change the appearance of the button in response to whether or not the operation mode is the presentation mode or the application mode. Given, however, that the application that is used in the presentation will vary from user to user, it is not possible to restrict the application to which the technology is to be applied.

SUMMARY OF THE INVENTION

The present invention was devised to solve the problems, and has as a feature changing the screen display of an application window that does not support a presentation between the application mode and the presentation mode, avoiding misidentification of the operation mode thereby.

According to one aspect of the present invention, there is provided a presentation apparatus, possessing, at least, an application mode adapted to performing an operation concerning to the application, and a presentation mode adapted to performing a drawing, comprising:

a first holding unit adapted to hold a parts data that includes at least one of a type, a location, and a size of a component part that is displayed within a selected screen area;

a second holding unit adapted to hold a selection rule that depicts the type of the component part that is to change a drawing state when the presentation apparatus is running in a presentation mode;

a selection unit adapted to select the component part from the parts data according to the selection rule; and a processing unit adapted to process the selected screen area by changing an image of the component part that is selected by the selection unit, and generate the image to be used in the presentation.

According to another aspect of the present invention, there is provided a presentation control method of a presentation apparatus possessing, at least, an application mode adapted to perform an operation concerning to the application, and a presentation mode adapted to perform a drawing, that uses a first holding unit adapted to hold a parts data that includes at least one of a type, a location, and a size of a component part that is displayed within a selected screen area, and a second holding unit adapted to hold a selection rule that depicts the type of the component part that is to change a drawing state when the presentation apparatus is running in a presentation mode, comprising the steps of:

selecting the component part from the parts data according to the selection rule; and processing the selected screen area by changing an image of the component part that is selected by the selection unit, and generating the image to be used in the presentation.

Further features of the present invention will become apparent from the following description of exemplary embodiments, with reference to the attached drawings.

BRIEF DESCRIPTION OF THE DRAWINGS

FIG. 3 depicts an example of a data structure of a parts data that corresponds to the application window.

DESCRIPTION OF THE EMBODIMENTS

Preferred embodiments of the present invention will now be described in detail, in accordance with the accompanying drawings.

First Embodiment

Figure 1:
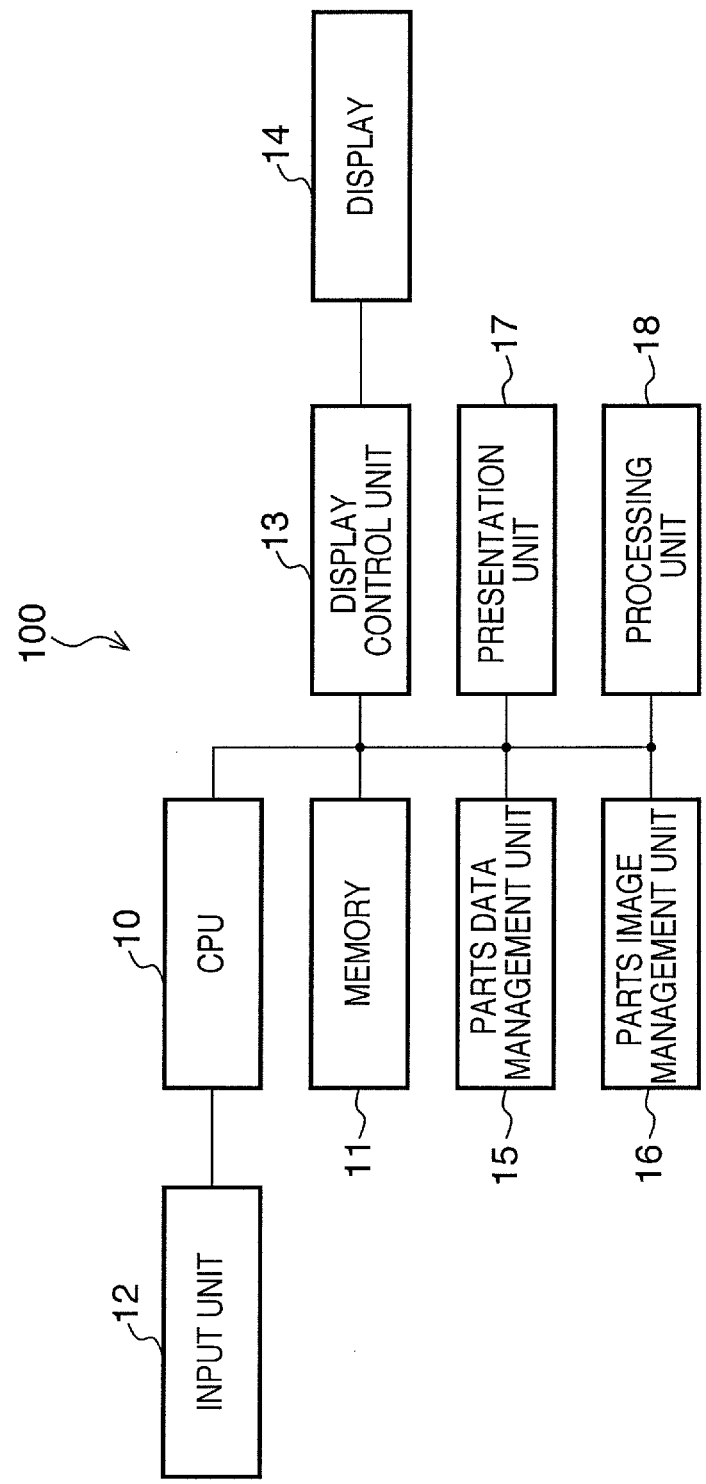
FIG. 1 is a block diagram depicting a configuration of a presentation apparatus according to a first embodiment.

FIG. 1 is a block diagram depicting a configuration of a presentation apparatus 100 according to a first embodiment. In FIG. 1, a CPU 10 controls the presentation apparatus 100 overall, according to a control program that is stored in such as a memory 11. The CPU 10 is capable of performing storage of data in the memory 11, or a process on each respective input from an input unit 12. An application program and/or display data are also stored in the memory 11, which is possessed of such as a RAM, which is capable of functioning as a work space when the CPU 10 executes a program, as well as such as a ROM or a hard drive, which stores such as the application program and/or the display data.

The input unit 12 possesses such as a keyboard and/or a mouse, with which the user performs an input. A display control unit 13 controls an output to a display 14, which is a display monitor of the presentation apparatus 100, and which displays such as an application window, such as depicted in FIG. 20, which the application provides.

Figure 2:
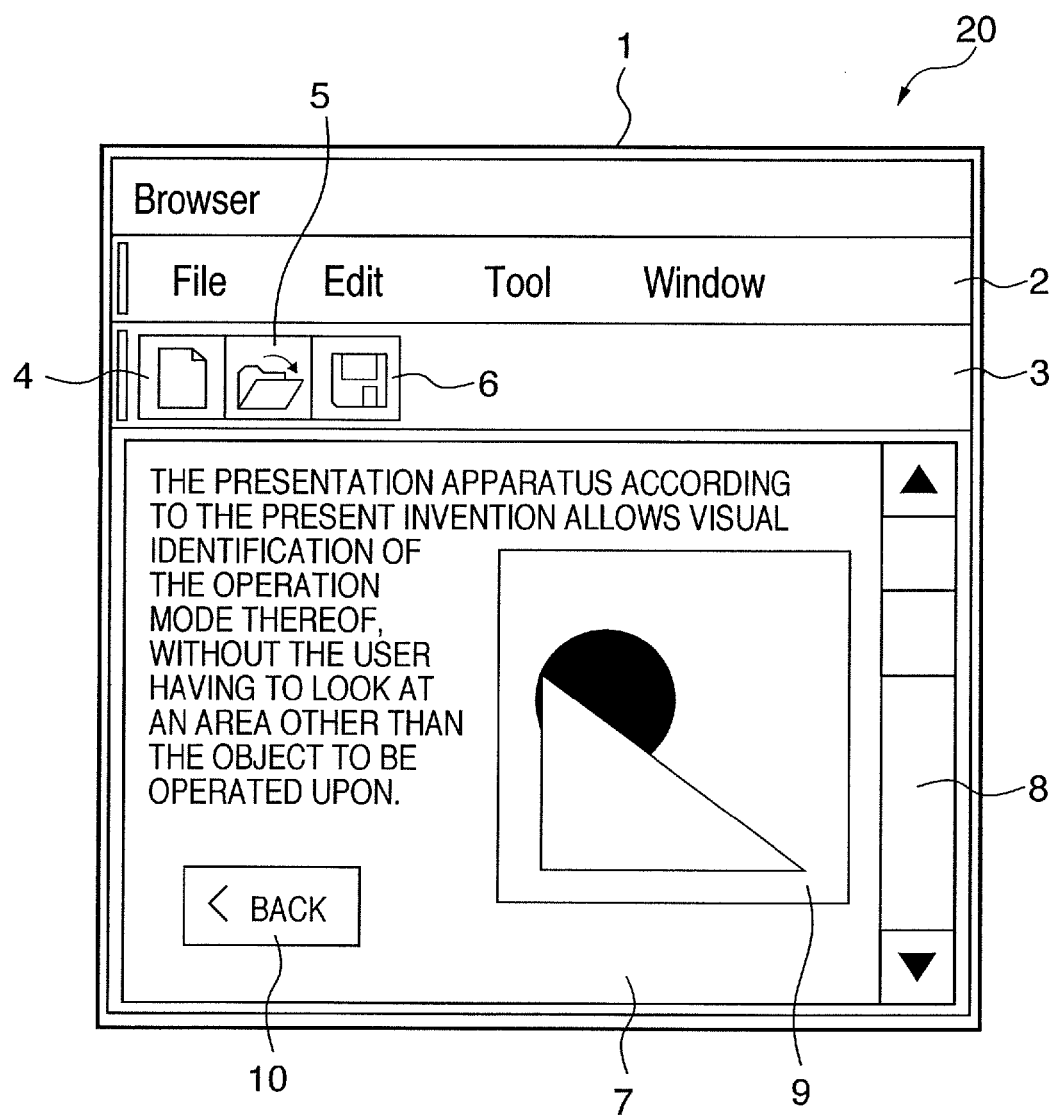
FIG. 2 depicts an example of a display screen of an application window.

A parts data management unit 15 manages a parts data of a component part that configures the application window. FIG. 3 depicts an example of a data structure of a parts data that the parts data management unit 15 manages. A parts data 30 that is depicted in FIG. 3 is the parts data of the component part that configures the application window 20 that is depicted in FIG. 2. The parts data 30 contains such information as an ID, a type, a location, a size, a color, and an owner of each respective component part. FIG. 2 depicts a correspondence between ID numbers 1 through 10 of the parts data 30 and the parts in the application window 20. Reference numerals 1 through 10 in FIG. 2 correspond to the ID numbers 1 through 10 of the parts data 30 in FIG. 3, respectively.

It is possible to acquire such parts data by querying a property information of a window, for example, when running Windows®. The ID numbers of the parts data 30 correspond in order in which the component parts are drawn onscreen, and thus, the application window 20 that is depicted in FIG. 2 is drawn by drawing each respective component part of the parts data 30 in order by ID number. An instance wherein the application has a plurality of application windows, or a plurality of application windows are open because a plurality of applications are running, is also conceivable. When thus working with the plurality of application windows, the parts data management unit 15 maintains the parts data such as per FIG. 3 on a per application window basis, and manages the correspondence between the parts data and each respective application window.

A parts image management unit 16 creates, updates, and manages an image of each part that configures the application window 20. The parts image management unit 16 creates an image of the component part that is registered with the parts data. The parts image management unit 16 stores and manages the image thus created in the memory 11. A presentation unit 17 performs a full range of presentation processes, including such as switching between operation modes, i.e., application mode or presentation mode, and directing a processing unit 18 to process the image of the component part, a process that is depicted in the flowchart in FIG. 5.

Figure 4:
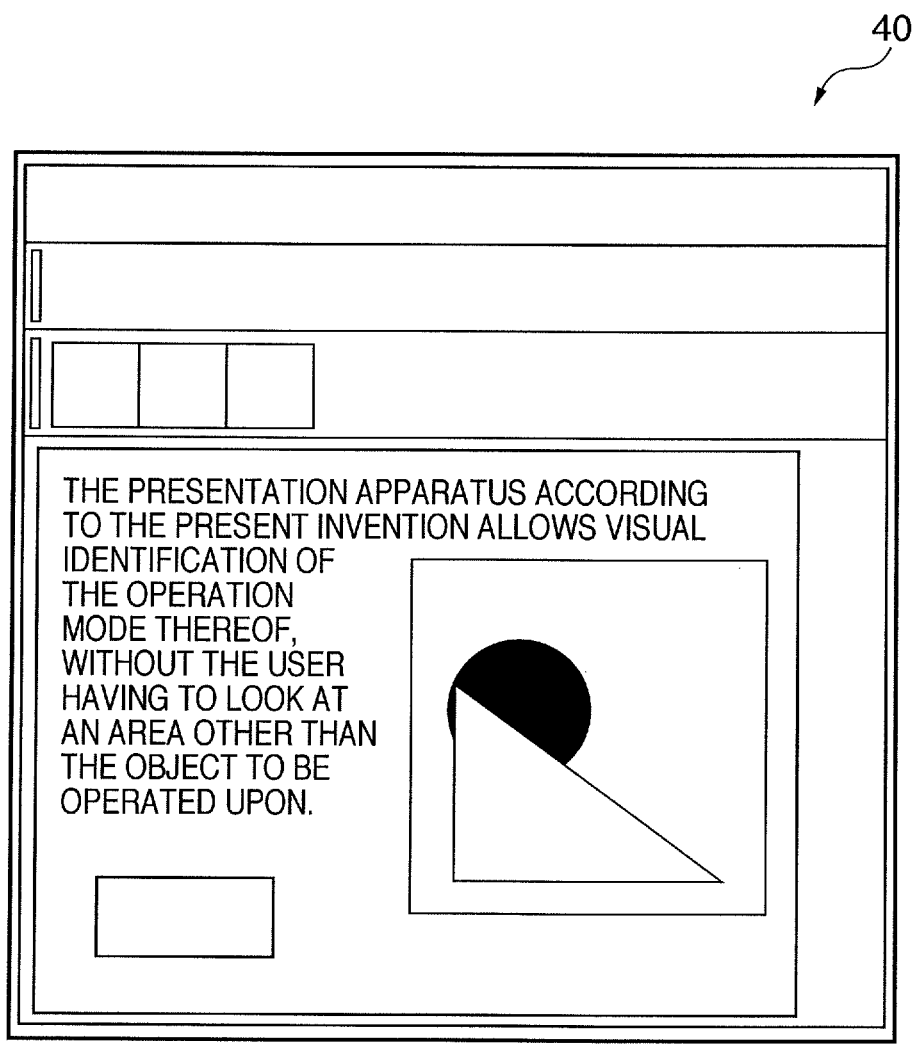
FIG. 4 depicts a display example of the application window in FIG. 2 when in presentation mode.

The processing unit 18 processes the image of the component part of the application window 20, according to the direction of the presentation unit 17. The processing unit 18 selects the component part to be processed from the parts data that the parts data management unit 15 manages, and processes the image of the selected component part, which the parts image management unit 16 manages, according to pre-configured processing rules, which may also be selection rules, for selecting the component part to have its drawing state changed in the presentation mode. According to the first embodiment, "Fill the component part whose Type is not "TextBox" or "PictureBox"" is presumed to be the processing rule. Accordingly, when performing the process based on the parts data 30, with regard to the component part of the application window 20, the component part that does not have an ID of 7 or 9 is filled, thus configuring an image 40, as depicted in FIG. 4. Thus the presentation image is generated. While it is presumed that the processing rule is pre-stored in the memory 11, it would also be permissible to configure the processing rule to be user-editable.

It would also be possible to use a size or a shape, i.e., an aspect ratio, of the component part as the processing rule with regard to the image of the component part. Examples of such rules that might be used would include:

invert a color of a part of a small size, i.e., a part whose area is less than or equal to a prescribed size;

draw a semi-transparent text, such as "COPY", in a part of a larger size, i.e., a part whose area is greater than or equal to a prescribed size; and apply a red border if the aspect ratio is greater than or equal to a given value.

It would also be possible to use the processing rules in combination or with a priority assignment thereto. The processing rule according to the embodiment is set to select the component part, such as the button that receives the user direction, and carry out the process such as fill or the like.

Implementation of the parts data management unit 15, the parts image management unit 16, the presentation unit 17, and the processing unit 18 by having the CPU 10 execute the control program would also be permissible. Accordingly, the presentation apparatus 100 may also be implemented via a general-purpose computer such as a personal computer.

Figure 5:
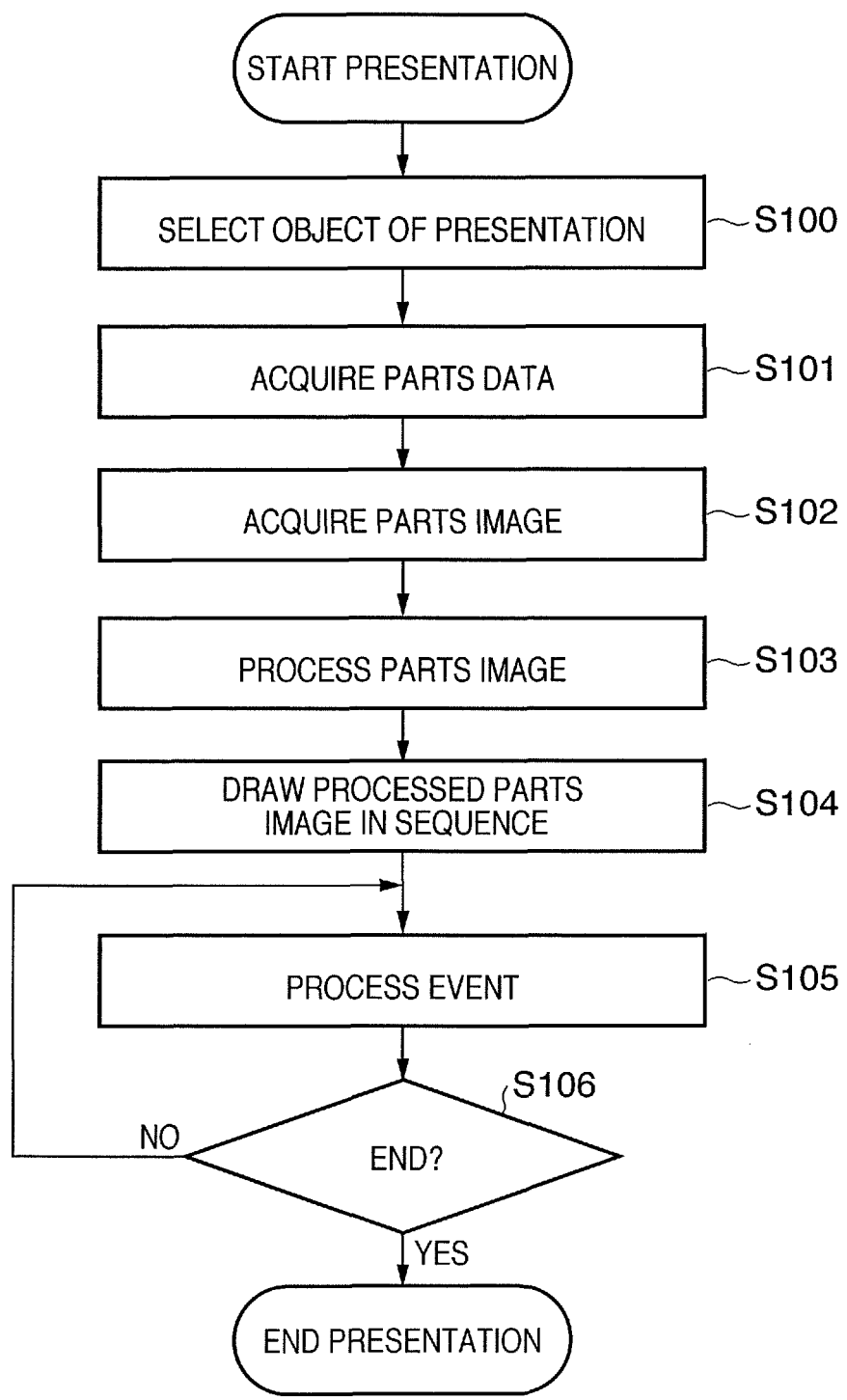
FIG. 5 is a flowchart that describes a process of creating a presentation mode screen, according to the first embodiment.

Following is a description of the application window process when running the presentation mode of the presentation apparatus 100, according to the first embodiment, with reference to the flowchart depicted in FIG. 5. FIG. 5 is a flowchart that describes a process of creating a presentation mode screen, according to the first embodiment. Each respective component part of the application window is captured and the drawing state changed on a per component part basis, and a presentation mode display performed, according to the first embodiment.

When the presentation commences, in step S100, the presentation unit 17 detects either the application window or a screen area that is selected as an object of the presentation. Hereinafter, the selected application window or screen area will also be collectively referred to as the selected screen area. The selection of the application window or screen area is achieved by the user operating the input unit 12. It is possible, for example, to use the mouse to select the application window, or to select the object of the presentation, i.e., to specify the selected screen area, by dragging the mouse to specify a rectangular area. It would also be possible to specify a plurality of application windows, or to specify the entire screen of the display 14 as the selected screen area.

In step S101, the presentation unit 17 acquires the parts data pertaining to the displayed component parts that are contained in the screen area that is selected from the parts data management unit 15, i.e., the application window and/or the screen area that is selected. In the present example, the application window 20 that is depicted in FIG. 2 is selected in step S100, and the parts data 30 that is depicted in FIG. 3 is acquired in step S101. In step S102, the image of each respective component that is contained in the parts data that is acquired in step S101 is acquired from the parts image management unit 16. In the present example, the image of each respective component part ID numbers 1 through 10 that is recited in the parts data 30 is acquired.

In step S103, the presentation unit 17 specifies the processing of the component part image that is acquired in step S102 for the processing unit 18, and acquires the processed image of each respective component part that is used in the presentation display. According to the processing rule, the processing unit 18 processes the image of the component parts of Type other than TextBox or PictureBox, i.e., the image of the component parts that correspond to the ID numbers 1 through 6, 8, and 10, into the filled images. It is possible, for example, for the fill to be performed with the color that is specified for the color of each respective parts data. It would also be possible for the fill to be either opaque or semi-transparent. In step S104, the presentation unit 17 draws the processed component image in order in the presentation window, in accordance with the location data that is contained in the parts data 30. As a result, the component parts with the ID numbers 1 through 6, 8, and 10 constitute a filled component image, leading to a display such as the image 40 in FIG. 4.

In step S105, the presentation unit 17 treats the image 40 that is acquired per the foregoing as a background image and executes a process in the presentation mode, i.e., a process such as the input event from the input unit 12 or an application event. As a result of the process, such actions are performed as launching or operating of applications, changing of the operation mode, changing of the parts data, changing of the parts image, or annotation. In step S106, the presentation unit 17 determines whether or not to continue with the presentation mode, and terminates the presentation mode if the presentation mode is not to be continued, i.e., S106 is "YES". If the presentation mode is to be continued, i.e., S106 is "NO", the process returns to step S105.

According to the first embodiment, the processing unit 18 processes the image of each respective component part that is managed by the parts image management unit 16, according to the processing rule, for example, to fill the component other than the component of Type TextBox or PictureBox. The presentation unit 17 controls the presentation so as to be performed based on the processed image. Accordingly, it is possible to clarify that the button type is inoperable during the presentation, by setting the processing rule to carry out such a process as filling on the component parts which receive a direction from the user in the application window. According to the first embodiment, it is thus possible to change the drawing state so as to indicate that a type of button that cannot be operated during the presentation is inoperable, for example, by filling thereof, and thus avoid an erroneous operation by making the user aware of the current operation mode of the program. Setting the processing rule to perform such a process as drawing a semi-transparent text for a component part that is of a larger size than a preset threshold value allows depicting that the component part is inoperable, while facilitating comprehension of the description within the component part.

Second Embodiment

According to the first embodiment, the part image is changed by capturing the image of each respective part according to the parts data 30, and changed by applying a process thereto. According to a second embodiment, a display is performed that informs the user that the application is in the presentation mode, by capturing the image of the selected application window and/or screen area, i.e., the selected screen area, and changing the image thus captured in accordance with the processing rule. A configuration of a presentation apparatus according to the second embodiment is similar to the presentation apparatus according to the first embodiment, in FIG. 1.

Figure 6:
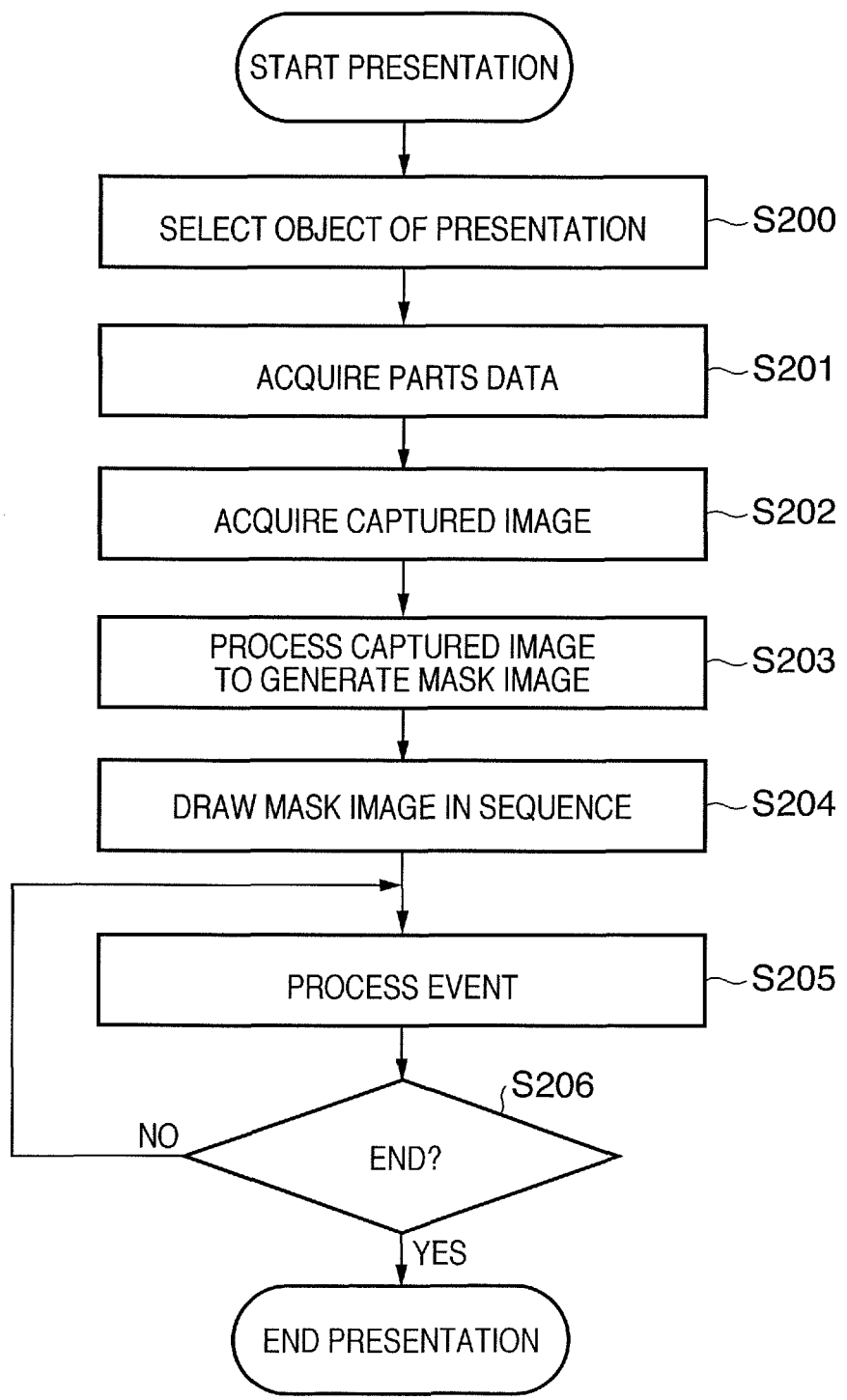
FIG. 6 is a flowchart that describes a process of creating a presentation mode screen, according to a second embodiment.

FIG. 6 is a flowchart that describes a process of creating a presentation mode screen, according to the second embodiment.

When the presentation commences, the presentation unit 17 detects the selected application window or screen area, i.e., the selected screen area, which is selected by the user as being intended for presentation, in step S200. In step S201, the presentation unit 17 acquires the part data from the parts data management unit 15 that corresponds to the selected screen area. The process thereto is similar to the process described in steps S100 and S101 according to the first embodiment.

In step S202, the presentation unit 17 acquires, as a captured image, a region from the display control unit 13 that contains the application window or screen area that is detected in step S200. In step S203, the presentation unit 17 acquires an image to be used in the presentation display, by directing the processing unit 18 to process the acquired captured image. The processing unit 18 performs a drawing of a mask image vis-à-vis the component image in the captured image to be processed. A mask image is a processed image acquired by processing each respective component part image in the application window, in such a manner as a fill, a color inversion, or a drawing of semi-transparent text, for example, "COPY", thereupon.

It is presumed that the processing rule according to the second embodiment is "Fill the part other than the part of Type TextBox or PictureBox," according to the first embodiment. Accordingly, the mask image vis-à-vis the Form component part that is depicted as ID No. 1 in FIG. 3 is a square of height 100 and width 100, which is filled in gray. The mask image vis-à-vis the TextBox component part that is ID No. 7 clips a rectangle of height 100 and width 70, starting at the image capture location (0, 30). The processing unit 18 generates a mask image for the selected component part by changing the drawing state according to the processing rule, and generates a mask image for the component parts other than the selected component part by extracting corresponding portion from the captured image. In step S204, the processing unit 18 draws the mask image that is thus acquired for each respective component part in the captured image, in order indicated by the parts data 30. For example, if the preceding process is performed on the image capture of the application window 20, the image 40 that is depicted in FIG. 4 is acquired. Thus, the processing unit 18 acquires and draws the image for the presentation display. It is desirable for the mask image thus generated to be positioned so as to overlap the selected screen area.

The process of the steps S205 and S206 are as per steps S105 and S106 according to the first embodiment. In step S205, a process such as the input event from the input unit 12 or an application event is processed. As a result of the process, such actions are performed as launching or operating of applications, changing of the operation mode, changing of the parts data, changing of the parts image, or annotation. In step S206, a determination is made as to whether the current mode is the presentation mode, and terminates the presentation mode if the current mode is not the presentation mode, i.e., S206 is "YES". If the current mode is the presentation mode, i.e., S206 is "NO", the process returns to step S205.

Third Embodiment

Following is a description according to a third embodiment, wherein the presentation is performed by generating a background image from the component part whose drawing state is to be changed, drawing the background image in a transparent window, and positioning the transparent window over the application window. A configuration of a presentation apparatus according to the third embodiment is similar to the presentation apparatus according to the first embodiment, in FIG. 1.

Figure 7:
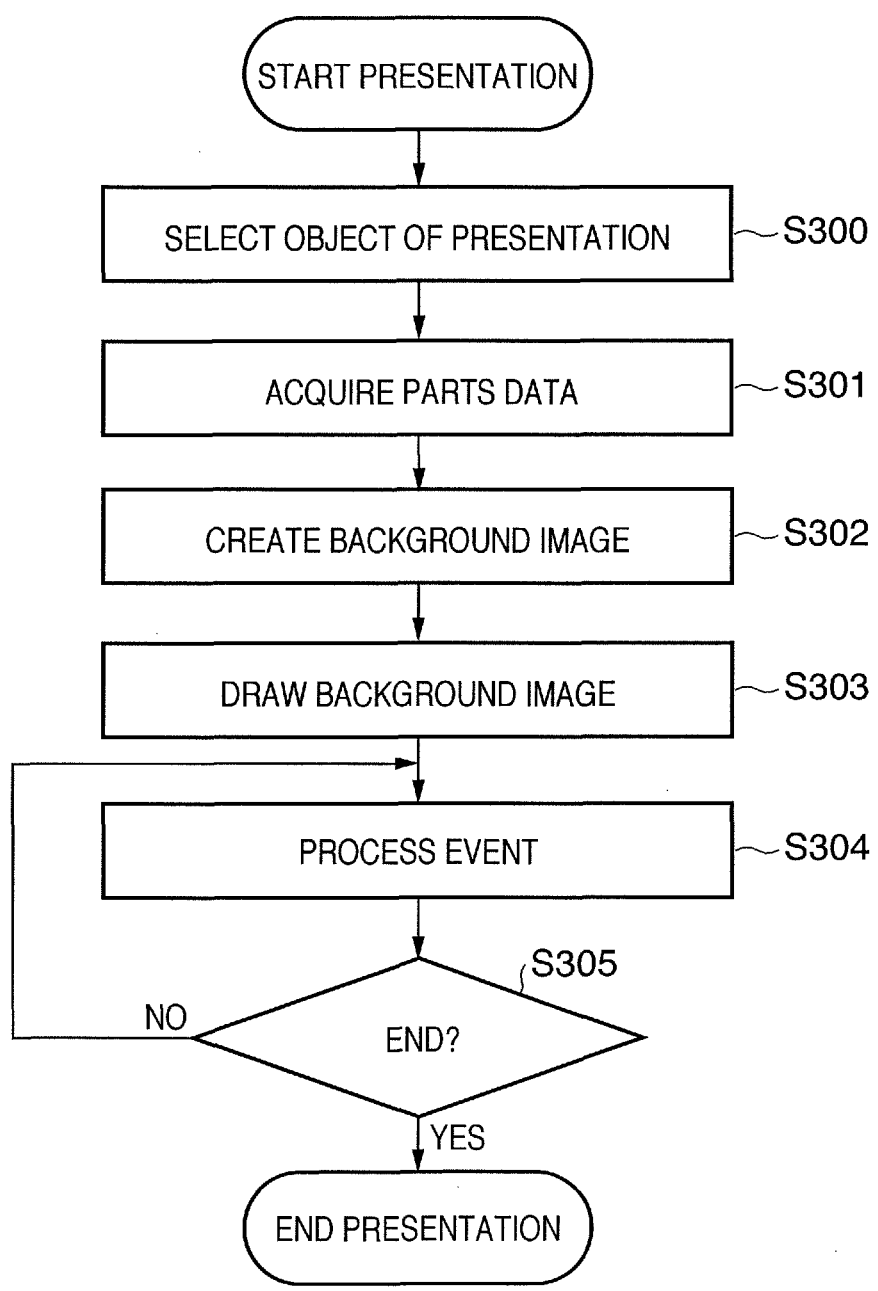
FIG. 7 is a flowchart that describes a process of creating a presentation mode screen, according to a third embodiment.

FIG. 7 is a flowchart that describes a process of creating a presentation mode screen, according to the third embodiment. The transparent window is positioned over the application window to perform the presentation, according to the third embodiment.

When the presentation commences, the presentation unit 17 detects the selected application window or screen area, i.e., the selected screen area, which is selected as being intended for presentation, in step S300. In step S301, the presentation unit 17 acquires the part data from the parts data management unit 15 that corresponds to the selected screen area. The process thereto is similar to the process described in steps S100 and S101 according to the first embodiment.

In step S302, the presentation unit 17 directs the processing unit 18 to create the background image for displaying in the transparent window. The processing unit 18 completes the background image by creating the mask image of each respective part, according to the parts data 30, and drawing the mask image in accordance with the parts data 30. A mask image is a processed image generated by processing each respective component part image in the application window in such a manner as a fill, a color inversion, or a drawing of semi-transparent text, for example, "COPY", thereupon.

Figure 8:
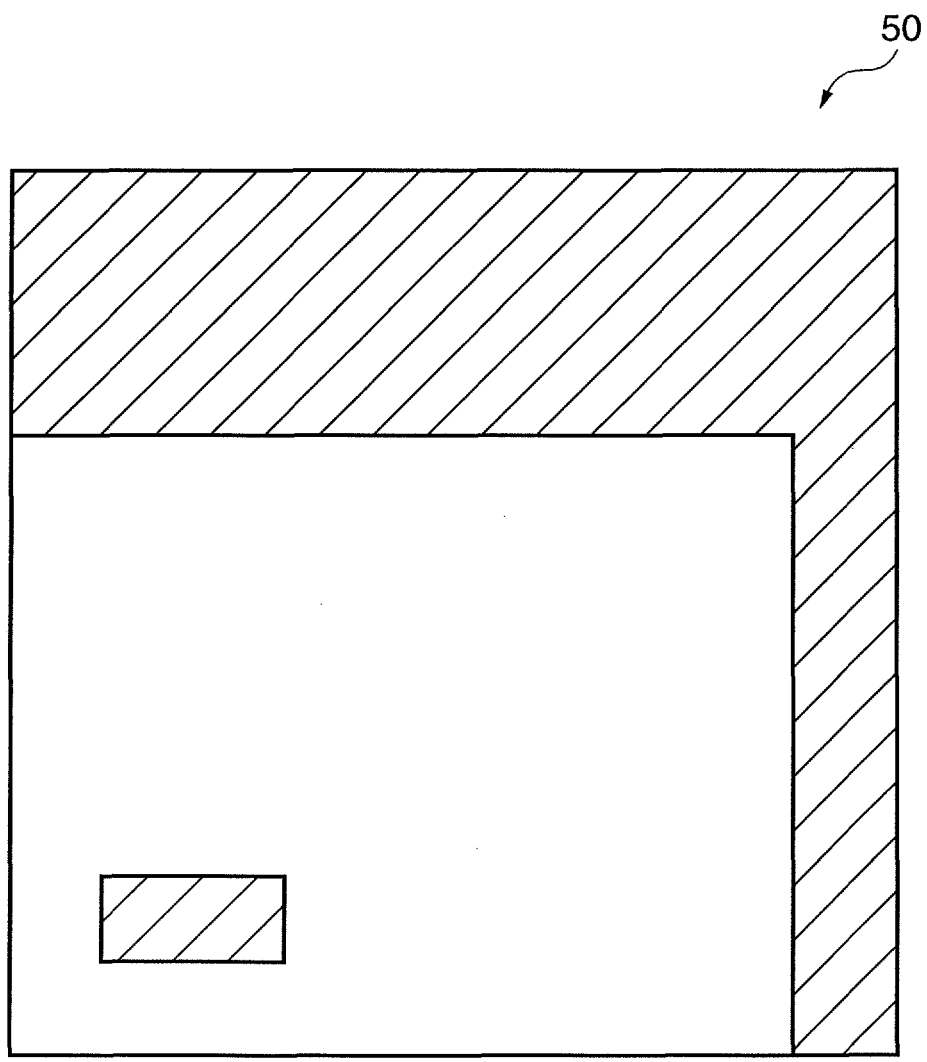
FIG. 8 depicts an example of a background image that is displayed in a transparent window.

It is presumed that the processing rule according to the third embodiment is "Fill the part other than the part of Type TextBox or PictureBox," according to the first and second embodiments. Accordingly, the mask image vis-à-vis the Form component part that is depicted as ID No. 1 in FIG. 3 is a square of height 100 and width 100, which is filled in gray. The mask image vis-à-vis the TextBox component part that is ID No. 7 is a rectangle of height 100 and width 70, and of a transparent color. The processing unit 18 generates a mask image whereupon is drawn either an opaque or a semi-transparent pattern, for the selected component part, and the processing unit 18 generates a transparent mask image for the component parts other than the selected component part. The processing unit 18 draws the mask image, in accordance with the parts data 30, thus obtaining a background image 50 that is depicted in FIG. 8. In the background image generated by the processing unit 18, the region where the transparent-colored component part is located at the top is transparent. Accordingly, the region where the component part ID No. 7 is overlaid on the component part ID No. 1 is transparent. The filled component part ID No. 8 or ID No. 10 is located above the component part ID No. 7, and thus, the portion whereby the component part ID No. 8 or ID No. 10 is present ceases to be transparent.

In step S303, the background image 50 thus generated is drawn in the transparent presentation window. For example, the background image 50 that is depicted in FIG. 8 is drawn in the transparent presentation window. When the presentation window wherein the background image is drawn is overlaid on the application window that is depicted in FIG. 2, a screen display such as is depicted in FIG. 4 is obtained. Positioning the transparent application window such that the background image overlaps the selected screen area causes the presentation window such as is depicted in FIG. 4 to be generated.

The process of the steps S304 and S305 are as per steps S105 and S106 according to the first embodiment. In step S304, a process such as the input event from the input unit 12 or an application event is processed. As a result of the process, such actions are performed as launching or operating of applications, changing of the operation mode, changing of the parts data, changing of the parts image, or annotation. In step S305, a determination is made as to whether the current mode is the presentation mode, and terminates the presentation mode if the current mode is not the presentation mode, i.e., S305 is "YES". If the current mode is the presentation mode, i.e., S305 is "NO", the process returns to step S304.

According to the embodiments, it is possible to visually identify the operation mode without taking one's eyes from the target of the operation, as it is now possible to change the screen display of the target of the operation in response to the operation mode, without restricting the application to which the present invention is to be applied.

In addition to the embodiments, it would be possible for the present invention to take on such embodiments as, for example, a system, an apparatus, a method, a program, or a storage medium. In particular, the present invention may be applied to a system that is configured from a plurality of devices, as well as an apparatus that is configured from a single device.

The present invention includes achieving the functions of the embodiments by supplying a software program to the system or the apparatus, either directly or remotely, and having a computer of the system or the apparatus load and execute the program code thus supplied. In such a circumstance, the program thus supplied corresponds to the flowcharts that are depicted in the drawings, according to the embodiments.

Accordingly, the program code that is installed on the computer in order to implement the function process of the present invention thereupon itself implements the present invention. The present invention includes the computer program that itself implements the function process of the present invention.

In such a circumstance, the program may take any form that possesses the function of the program, such as object code, a program that is executed by an interpreter, or a script that is supplied to an operating system.

The following are examples of storage media that may be used in supplying the program: a floppy disk, a hard drive, an optical disc, a magneto-optical disk (MO), a CD-ROM, a CD-R, a CD-RW, a magnetic tape, a nonvolatile memory card, a ROM, or DVD (DVD-ROM, DVD-R), etc.

Another method of supplying the program would be to use a web browser on a client computer to connect to a webpage on the Internet and download the computer program of the present invention from the webpage to a hard drive or other storage medium. The program thus downloaded may be a compressed file with an auto-install function. It would also be possible for the program code that configures the program of the present invention to be implemented by segmentation into a plurality of files, each of which is downloaded from a different webpage. A web server that downloads the program file that implements the functions of the present invention on the computer to a plurality of users is thus also included within the present invention.

It would also be possible to encrypt the program of the present invention, store the encrypted data on a CD-ROM or other storage medium, and distribute the program thereby. In such a circumstance, it would also be possible to download a key information via a webpage on the Internet that decrypts the encrypted data to a user who meets a prescribed condition, and to use the key information to execute and install the program on the computer.

It would also be possible to implement the functions of the embodiments through having the computer execute the program loaded therein, as well as a collaboration between the program and the operating system or other software running on the computer, in accordance with the instructions of the program. In such a circumstance, the functions of the embodiments are implemented by the process that is performed in whole or in part by the operating system or other software.

It is also permissible for the functions of the embodiments to be implemented, in whole or in part, by having the program that is loaded from the recording medium written to a memory that is built into an expansion board that is installed into the computer, or into an expansion unit that is attached to the computer. In such a circumstance, when the program is written to the expansion board or the expansion unit, a CPU or other hardware that is built into the expansion board or the expansion unit performs the actual process, in whole or in part, in accordance with the directions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-212242, filed Aug. 3, 2006, which is hereby incorporated by reference herein in its entirety.

What is claimed is:

1. A presentation apparatus, which can operate in a plurality of modes, including an application mode and a presentation mode, the presentation apparatus comprising:
at least a CPU and a memory, which function as: an acquisition unit configured to acquire type information and size information of one or more component parts displayed on an application window in an application mode;
a specifying unit configured to specify, from the one or more component parts displayed on the application window in the application mode, based on the type information and the size information, a component part whose type information corresponds to a button and a component part smaller than a predetermined size; and
a processing unit configured to change a drawing state of the component part specified by the specifying unit so as to indicate that the operation of the application via the component part is impossible and does not change a drawing state of a component part having a size bigger than the predetermined size and is other than the component part whose type information corresponds to the button, in a case where a mode is changed from the application mode to the presentation mode.

2. The presentation apparatus according to claim 1, wherein the CPU and the memory further cooperate to function as a holding unit configured to hold image data of each of the component parts displayed in the application mode, wherein the processing unit changes the image data of the component part specified by the specifying unit using the image data held in the holding unit.

3. The presentation apparatus according to claim 1, wherein the processing unit:
captures an image that includes the application window displayed in the application mode;
generates a first mask image by changing a drawing state of the component part specified by the specifying unit as the component part via which the operation of the application is impossible in the presentation mode;
generates a second mask image for a component part other than the specified component part by extracting a relevant portion from the captured image; and
displays the captured image based on the first and second mask images in the presentation mode.

4. The presentation apparatus according to claim 1, wherein the processing unit generates an image to be displayed in the presentation mode by:
generating a first mask image by changing a drawing state of the component part specified by the specifying unit; and
generating a transparent mask image for a component part other than the specified component part.

5. The presentation apparatus according to claim 1, wherein
the acquisition unit is further configured to acquire shape information of the one or more component parts displayed on the application window in the application mode,
the specifying unit is further configured to specify, from the one or more component parts displayed on the application window in the application mode, a component part corresponding to a predetermined shape based on the shape information, and
the processing unit is further configured to change a drawing state of one or more component parts, including a component part whose type information corresponds to the button, a component part smaller than the predetermined size, and a component part corresponding to the predetermined shape, and does not change a drawing state of a predetermined component part which is not specified by the specifying unit, in a case where a mode is changed from the application mode to the presentation mode.

6. The apparatus according to claim 1, wherein the processing unit changes the drawing state of the component part specified by the specifying unit such that a description in the component part is maintained as readable by a user.

7. The apparatus according to claim 1, wherein the acquisition unit acquires the type information of the one or more component parts displayed on the application window, corresponding to the application whose mode is changed from the application mode to the presentation mode, from property information of an operating system.

8. A presentation control method of a presentation apparatus that can operate in a plurality of modes, including an application mode and a presentation mode, the control method comprising steps of:
acquiring type information and size information of one or more component parts displayed on an application window in an application mode;
specifying, from the one or more component parts displayed on the application window in the application mode, based on the type information and the size information, a component part whose type information corresponds to a button and a component part smaller than a predetermined size; and
changing a drawing state of the component part specified in the specifying step so as to indicate that the operation of the application via the component part is impossible, in a case where a mode is changed from the application mode to the presentation mode,
wherein a drawing state of a component part which is not specified in the specifying step is not changed in the changing step.

9. The control method according to claim 8, further comprising a step of holding image data of each of the component parts displayed in the application mode, wherein the changing step includes changing the image data of the component part specified in the specifying step using the image data held in the holding step.

10. The control method according to claim 8, wherein the changing step includes:
   capturing an image that includes the application window displayed in the application mode;
   generating a first mask image by changing a drawing state of the component part specified in the specifying step as a component part via which the operation of the application is impossible in the presentation mode;
   generating a second mask image for a component part other than the specified component part, by extracting a relevant portion from the captured image; and
   displaying the captured image based on the first and second mask images in the presentation mode.

11. The control method according to claim 8, wherein the changing step includes generating an image to be displayed in the presentation mode by:
   generating a mask image by changing a drawing state of the component part specified in the specifying step; and
   generating a transparent mask image for a component part other than the specified component part.

12. The control method according to claim 8,
   wherein the acquiring step includes acquiring shape information of the one or more component parts displayed on the application window in the application mode,
   wherein the specifying step includes specifying, from the one or more component parts displayed on the application window in the application mode, a component part corresponding to a predetermined shape based on the shape information, and
   wherein the changing step includes changing a drawing state of one or more component parts, including a component part whose type information corresponds to the button, a component part smaller than the predetermined size, and a component part corresponding to the predetermined shape, and does not change a drawing state of a predetermined component part which is not specified in the specifying step, in a case where a mode is changed from the application mode to the presentation mode.

13. A non-transitory computer-readable storage medium storing a program that when executed causes a computer to perform a control method of a presentation apparatus, the control method comprising steps of:
   acquiring type information and size information of one or more component parts displayed on an application window in an application mode;
   specifying, from the one or more component parts displayed on the application window in the application mode, based on the type information and the size information, a component part whose type information corresponds to a button and a component part smaller than a predetermined size; and
   changing a drawing state of the component part specified in the specifying step so as to indicate that the operation of the application via the component part is impossible, in a case where a mode is changed from the application mode to the presentation mode,
   wherein a drawing state of a component part which is not specified in the specifying step is not changed in the changing step.

* * * * *